[12] United States Patent
Bezemer et al.

(10) Patent No.: US 8,431,507 B2
(45) Date of Patent: Apr. 30, 2013

(54) PROCESS FOR REGENERATING A CATALYST

(75) Inventors: Gerrit Leendert Bezemer, Amsterdam (NL); Stephen Nkrumah, Amsterdam (NL); Thomas Joris Remans, Amsterdam (NL)

(73) Assignee: Shell Oil Company, Houston, TX (US)

( * ) Notice: Subject to any disclaimer, the term of this patent is extended or adjusted under 35 U.S.C. 154(b) by 383 days.

(21) Appl. No.: 12/411,464

(22) Filed: Mar. 26, 2009

(65) Prior Publication Data

US 2009/0247393 A1 Oct. 1, 2009

(30) Foreign Application Priority Data

Mar. 28, 2008 (EP) .................................... 08103088

(51) Int. Cl.
*B01J 38/18* (2006.01)
(52) U.S. Cl.
USPC ............................................................ 502/50
(58) Field of Classification Search ................. 502/50
See application file for complete search history.

(56) References Cited

U.S. PATENT DOCUMENTS

| | | | | |
|---|---|---|---|---|
| 4,359,400 A * | 11/1982 | Landolt et al. | ................ | 502/53 |
| 4,399,234 A | 8/1983 | Beuther et al. | ................ | 518/715 |
| 4,492,774 A | 1/1985 | Kibby et al. | ................ | 518/713 |
| 4,595,703 A | 6/1986 | Payne et al. | ................ | 518/715 |
| 4,670,414 A | 6/1987 | Kobylinski et al. | ........... | 502/174 |
| 5,169,821 A | 12/1992 | Soled et al. | ................ | 502/242 |
| 5,728,918 A | 3/1998 | Nay et al. | ................ | 585/733 |
| 6,455,596 B2 * | 9/2002 | Lapidus et al. | ............... | 518/709 |
| 6,531,518 B1 | 3/2003 | Lapidus et al. | ............... | 518/709 |
| 6,812,179 B2 * | 11/2004 | Huang et al. | ................ | 502/41 |
| 7,012,103 B2 * | 3/2006 | Espinoza et al. | ............. | 518/706 |
| 2002/0187094 A1 * | 12/2002 | Motal et al. | ............. | 423/244.01 |
| 2003/0018088 A1 * | 1/2003 | Raje et al. | ................ | 518/715 |
| 2003/0144131 A1 | 7/2003 | Koveal et al. | ................ | 502/38 |

FOREIGN PATENT DOCUMENTS

| | | | |
|---|---|---|---|
| EP | 253924 | | 1/1988 |
| GB | 2222531 A | * | 3/1990 |
| WO | WO9700231 | | 1/1997 |
| WO | WO0209873 | | 2/2002 |
| WO | WO03068396 | | 8/2003 |

OTHER PUBLICATIONS

Doolin et al, Catalytic Naphtha Reforming, 2004, chap. 11.*

* cited by examiner

*Primary Examiner* — Melvin C Mayes
*Assistant Examiner* — Stefanie Cohen

(57) ABSTRACT

A process for regenerating a fixed bed of Fischer-Tropsch catalyst particles, of which at least 40 wt % of the catalyst particles have a size of at least 1 mm, in situ in a Fischer-Tropsch reactor tube. The process comprises the steps of: (i) optionally oxidizing the catalyst at a temperature between 200 and 400° C.; (ii) oxidizing the catalyst at a temperature above 580° C. and below 670° C.; and (iii) reducing the catalyst with hydrogen or a hydrogen comprising gas. This process may be preceded by a step in which Fischer-Tropsch product is removed from the catalyst.

7 Claims, No Drawings

US 8,431,507 B2

PROCESS FOR REGENERATING A CATALYST

This application claims the benefit of European Application No. 08103088.4 filed Mar. 28, 2008.

BACKGROUND OF THE INVENTION

The present invention relates to a process for regenerating a catalyst. The catalyst is suitable for use in producing normally gaseous, normally liquid and optionally solid hydrocarbons from synthesis gas generally provided from a hydrocarbonaceous feed, for example a Fischer-Tropsch process. The invention further relates to the regenerated catalyst and the use thereof in Fischer-Tropsch processes. The invention especially relates to a process for regenerating a fixed bed of Fischer-Tropsch catalyst particles in situ in a reactor tube.

The Fischer-Tropsch process can be used for the conversion of synthesis gas (from hydrocarbonaceous feed stocks) into liquid and/or solid hydrocarbons. Generally, the feed stock (e.g. natural gas, associated gas and/or coal-bed methane, heavy and/or residual oil fractions, coal, biomass) is converted in a first step into a mixture of hydrogen and carbon monoxide (this mixture is often referred to as synthesis gas or syngas). The synthesis gas is then fed into a reactor where it is converted in one or more steps over a suitable catalyst at elevated temperature and pressure into paraffinic compounds and water. The obtained paraffinic compounds range from methane to high molecular weight modules. The obtained high molecular weight modules can comprise up to 200 carbon atoms, or, under particular circumstances, even more carbon atoms.

Numerous types of reactor systems have been developed for carrying out the Fischer-Tropsch reaction. For example, Fischer-Tropsch reactor systems include fixed bed reactors, especially multi-tubular fixed bed reactors, fluidised bed reactors, such as entrained fluidised bed reactors and fixed fluidised bed reactors, and slurry bed reactors such as three-phase slurry bubble columns and ebulated bed reactors.

Catalysts used in the Fischer-Tropsch synthesis often comprise a carrier based support material and one or more metals from Group 8-10 of the Periodic Table, especially from the cobalt or iron groups, optionally in combination with one or more metal oxides and/or metals as promoters selected from zirconium, titanium, chromium, vanadium and manganese, especially manganese. Such catalysts are known in the art and have been described for example, in the specifications of WO 9700231A and U.S. Pat. No. 4,595,703.

One of the limitations of a Fischer-Tropsch process is that the activity of the catalyst will, due to a number of factors, decrease over time. A catalyst that shows a decreased activity after use in a Fischer-Tropsch process is sometimes referred to as deactivated catalyst, even though it usually still shows activity. Sometimes such a catalyst is referred to as a deteriorated catalyst. Sometimes it is possible to regenerate the catalyst. This may be performed, for example, with one or more oxidation and/or reduction steps.

Even when regenerated, the catalysts often show a much lower physical strength then freshly prepared catalysts. This is especially the case for fixed bed catalysts, such as pellets and extrudates larger than 1 mm. And in case the shape and/or size of a fixed bed catalyst was changed during Fischer-Tropsch process, for example the particles may have swollen, regeneration generally does not reverse that. This thus limits the possibilities of using the regenerated fixed bed catalyst particles in a Fischer-Tropsch reaction again.

It would be an advancement in the art to provide an improved process for regenerating a cobalt comprising Fischer-Tropsch catalyst, especially a process in which the catalyst is regenerated in situ in a fixed bed reactor. Regenerating is sometimes referred to as rejuvenating.

SUMMARY OF THE INVENTION

The catalyst to be regenerated comprises cobalt and titania and has been deactivated by use in a Fischer-Tropsch process. The activity of the deactivated catalyst is at least 10% lower as compared to its initial activity when it was fresh prepared. The catalyst may be fully deactivated. For some cases it may be advantageous to regenerate a catalyst when its activity has been reduced at least 50%. For some cases it may be advantageous to regenerate a catalyst when its activity has been reduced at most 80%.

According to one aspect of the present invention, there is provided a process for regenerating fixed bed Fischer-Tropsch catalyst particles, of which at least 1 wt % of the catalyst particles has a size of at least 1 mm, and the fixed bed comprises cobalt and titania comprising Fischer-Tropsch catalyst particles which have been deactivated by use in a Fischer-Tropsch process, said process for regenerating comprising the steps of:

(i) optionally oxidising catalyst particles at a temperature between 200 and 400° C.;

(ii) oxidising catalyst particle at a temperature above 580° C., preferably above 600° C., and below 670° C., preferably below 650° C.; and (iii) optionally reducing catalyst particles with hydrogen or a hydrogen comprising gas.

DETAILED DESCRIPTION OF THE INVENTION

Particles having a particle size of at least 1 mm are defined as particles having a longest internal straight length of at least 1 mm.

With the process according to the present invention, the strength of the deactivated cobalt and titania comprising Fischer-Tropsch catalyst particles can be increased significantly, and/or any swollen catalyst particles can be made to shrink significantly, while the catalyst particles show sufficient catalytic activity after the regeneration.

Preferably each of the oxidation step or steps and the optional reduction step are performed in situ in a Fischer-Tropsch reactor, whereby the fixed bed particles are normally situated in one or more reactor tubes in the reactor. More preferably the oxidation of step (i), the oxidation of step (ii), and the reduction of step (iii) are all performed, and are all performed in situ.

One may perform the regeneration process of the present invention on a single reactor tube comprising a fixed bed of Fischer-Tropsch catalyst particles. Alternatively, more than one reactor tube, each comprising a fixed bed of Fischer-Tropsch catalyst particles, may be regenerated at the same time.

According to a preferred embodiment of the present invention, there is provided a process for regenerating a fixed bed of Fischer-Tropsch catalyst particles, of which at least 40 wt % of the catalyst particles has a size of at least 1 mm, and the fixed bed comprises cobalt and titania comprising Fischer-Tropsch catalyst particles which have been deactivated by use in a Fischer-Tropsch process, said process for regenerating being performed in situ in a Fischer-Tropsch reactor tube, and comprising the steps of:

(i) optionally oxidising catalyst particles at a temperature between 200 and 400° C.;

(ii) oxidising catalyst particles at a temperature above 580° C., preferably above 600° C., and below 670° C., preferably below 650° C.; and (iii) reducing catalyst particles with hydrogen or a hydrogen comprising gas.

One advantage of performing the regeneration in situ in a reactor tube is that the catalyst bed does not need to be taken out of the reactor tube, and also does not need to be put back in the reactor tube. This simplifies the procedure and also saves time and equipment. After the regeneration, the catalyst particles in the fixed bed may be used in a Fischer-Tropsch process again by contacting the fixed bed with a mixture of carbon monoxide and hydrogen at an elevated temperature and pressure.

In an even more preferred embodiment of the regeneration process of the present invention, both oxidation step (i) and (ii) are performed. Oxidation may be performed by passing an oxygen containing gas through the fixed bed of catalyst particles. The temperature of the oxidation of step (i) and/or the oxidation step (ii) may be controlled, among others, by controlling the oxygen concentration and the temperature of the oxygen containing gas at the inlet of the reactor (tube).

During the regeneration process of the current invention, the oxidation step(s) are preferably performed in the absence of water. Some water (or steam) may be present, but preferably less than 1 vol % of the gas passing the particles consists of water, more preferably less than 0.1 vol %, even more preferably less than 0.01 vol %, most preferably less than 0.001 vol %.

During the regeneration process of the current invention, the metallic cobalt present in the deactivated catalyst particles is reacted to form cobalt oxide, such as $CoO$ and $Co_3O_4$. Preferably the metallic cobalt in the deactivated particles is directly converted to cobalt oxides, i.e. without forming intermediate products like cobalt salts.

In case the regeneration process is performed in situ, the oxidation step (ii) preferably is performed as follows. An oxygen containing gas flows through the reactor tube, while cooling the reactor tube from the outside. Obviously, when the gas flows through the reactor tube, it also flows through the fixed bed of catalyst particles. The cooling may be performed using any cooling medium, for example water and/or steam. By performing the process in this way, sensitive parts of the reactor can be protected from becoming too warm for a too long period of time. The relatively small area in the tube where most of the oxidation takes place, i.e. at the reaction front, moves from the inlet of the gas towards the outlet. The temperature of this front can be controlled by controlling the gas inlet temperature, and/or the concentration of oxygen in the gas at the inlet, and/or the space velocity of the oxygen containing gas, and/or the cooling at the outside of the tubes.

In case the regeneration process is performed in situ, the oxidation step (ii) most preferably is performed as follows. An inert gas flows through the reactor tube, whereby the inert gas may have an elevated temperature. For step (ii), the inert gas more preferably has a temperature in the range of 50° C. to 200° C., even more preferably 75° C. to 150° C. At the same time, the reactor tube is cooled from the outside, for example by means of water around the reactor tube. Then oxygen containing gas is passed through the reactor tube, whereby the oxygen concentration and/or the gas temperature at the inlet of the reactor (tube) and/or the space velocity of the gas may be adjusted during the process, and the reactor tube is cooled from the outside.

In case step (ii) is performed in situ, preferably at least 60 wt %, more preferably at least 70 wt %, even more preferably at least 80 wt %, of the catalyst particles in the fixed bed consist of particles with a size of at least 1 mm, more preferably at least 1.5 mm, even more preferably at least 2 mm, most preferably at least 3 mm. And in that case preferably at least 80 wt %, more preferably at least 99 wt % of the catalyst particles in the fixed bed has a size of 6 mm or smaller, more preferably 5 mm or smaller.

In case step (ii) is performed ex situ, preferably at least 5 wt %, more preferably at least 10 wt %, of the deactivated catalyst particles have a size of at least 1 mm, more preferably at least 1.5 mm, even more preferably at least 2 mm, most preferably at least 3 mm.

In one embodiment, deactivated catalyst particles are oxidised at a temperature between 200 and 400° C. in the reactor; in a subsequent step the resulting catalyst particles, or a part of the resulting catalyst particles, are removed from the reactor; and in a subsequent step the removed catalyst particles, or a part of the removed catalyst particles, are further oxidised at a temperature above 580° C. outside the reactor. Oxidised particles with a size of at least 1 mm may be reloaded in the reactor, and in a subsequent step reduced in the reactor with hydrogen or a hydrogen comprising gas. Alternatively, the oxidised particles, or the part of the oxidised particles with a size of less than 1 mm, may be processed when preparing new catalyst particles that have a size of at least 1 mm. For example, such particles may be pulverised to a size smaller than 1 mm, preferably smaller than 0.5 mm, and mixed with fresh catalyst material, and then shaped, e.g. extruded.

According to a further aspect of the present invention, the process of the current invention is preceded by a step in which Fischer-Tropsch synthesis product is removed from the fixed bed of catalyst particles. Fischer-Tropsch synthesis product is preferably removed in situ in the reactor. This may be performed by washing the fixed bed with a hydrocarbon that is lighter than the Fischer-Tropsch synthesis product. For example, Fischer-Tropsch wax may be removed by washing with gas oil; the gas oil may be petroleum gas oil, or preferably, a synthetic gas oil, for example a gas oil produced using Fischer-Tropsch synthesis. After this removal step, the reactor tube preferably comprises less than 30 grams hydrocarbons per 100 grams catalyst particles, more preferably less than 10 grams hydrocarbons per 100 grams catalyst particles, most preferably less than 5 grams hydrocarbons per 100 grams catalyst particles.

The present invention also provides a regenerated catalyst bed that can be obtained by the regeneration process of the current invention. The present invention also provides a process comprising the use of a catalyst bed according to the invention in a Fischer-Tropsch synthesis process.

One advantage of the process of the present invention is that with the process of the present invention the strength of a deteriorated catalyst can be restored. Hence, after the process of the invention, rejuvenated catalysts can be obtained that show a strength that is comparable to, or only slightly lower than, the strength they showed when they were fresh prepared.

Another advantage is that swollen catalyst particles can be made to shrink significantly with a process according to the present invention. Hence, after the process of the invention, rejuvenated catalysts can be obtained with a diameter which is comparable to, or only slightly larger than, or only slightly smaller than, the diameter they had when they were fresh prepared. In case shrink is desired, step (ii) preferably is performed by oxidising the catalyst at a temperature above 580° C., more preferably above 600° C.

The oxidation step(s) may be performed by treating the catalyst with an oxygen-containing gas at the above-indicated temperatures. A reduction step may be performed by contacting the catalyst with hydrogen or a hydrogen-containing gas, typically at temperatures of about 200 to 350° C.

A Fischer-Tropsch catalyst or catalyst precursor comprises a catalytically active metal or precursor therefor, and optionally promoters, supported on a catalyst carrier. The catalyst carrier in this case comprises titania, preferably porous titania. Preferably more than 70 weight percent of the carrier material consists of titania, more preferably more than 80 weight percent, most preferably more than 90 weight percent, calculated on the total weight of the carrier material. As an example of a suitable carrier material can be mentioned the commercially available Titanium Dioxide P25 ex Evonik Industries.

The carrier preferably comprises less than 40 wt % rutile, more preferably less than 30 wt %, even more preferably less than 20 wt %.

The carrier may further comprise another refractory metal oxide or silicate or combinations thereof. Examples of suitable carrier materials that may be present in the catalyst in addition to titania include: silica, alumina, zirconia, ceria, gallia and mixtures thereof, especially silica and alumina.

Preferably the carrier comprises less than 100 ppm silica, more preferably less than 50 ppm silica. Preferably the carrier comprises less than 100 ppm alumina, more preferably less than 50 ppm alumina. Preferably the carrier comprises less than 100 ppm zirconia, more preferably less than 50 ppm zirconia. Preferably the carrier comprises less than 100 ppm ceria, more preferably less than 50 ppm ceria. Preferably the carrier comprises less than 100 ppm gallia, more preferably less than 50 ppm gallia.

The catalytically active metal in the catalyst is cobalt. Cobalt may be added to the titania carrier in the form of, for example, cobalt hydroxide, CoOOH, cobalt oxide, a co-precipitate of cobalt and manganese hydroxide, a cobalt nitrite, or a cobalt ammonium complex, for example cobalt ammonium carbonate. The catalyst may also include one or more further components, such as promoters and/or co-catalysts.

Suitable co-catalysts include one or more metals such as iron, nickel, or one or more noble metals from Group 8-10 of the Periodic Table of Elements. Preferred noble metals are platinum, palladium, rhodium, ruthenium, iridium and osmium. Such co-catalysts are usually present in small amounts.

References to "Groups" and the Periodic Table as used herein relate to the new IUPAC version of the Periodic Table of Elements such as that described in the 87th Edition of the Handbook of Chemistry and Physics (CRC Press).

Typically, the amount of catalytically active metal present in the catalyst may range from 1 to 100 parts by weight per 100 parts by weight of carrier material, preferably from 3 to 50 parts by weight per 100 parts by weight of carrier material.

The catalyst may further comprise one or more promoters. One or more metals or metal oxides may be present as promoters, more particularly one or more d-metals or d-metal oxides. Suitable metal oxide promoters may be selected from Groups 2-7 of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are most suitable promoters. Suitable metal promoters may be selected from Groups 7-10 of the Periodic Table of Elements.

Manganese, iron, rhenium and Group 8-10 noble metals are particularly suitable as promoters, and are preferably provided in the form of a salt or hydroxide.

The promoter, if present in the catalyst, is typically present in an amount of from 0.001 to 100 parts by weight per 100 parts by weight of carrier material, preferably 0.05 to 20, more preferably 0.1 to 15. It will however be appreciated that the optimum amount of promoter may vary for the respective elements which act as promoter.

One particularly preferred Fischer-Tropsch catalyst comprises a manganese or vanadium promoter.

When fresh prepared, the catalyst is shaped or formed, for example by means of pelletizing, (wheel) pressing, or extrusion. The catalytically active metal and/or any promoter may have been added to the carrier material before or after shaping. For example, a cobalt compound, preferably cobalt hydroxide, CoOOH, cobalt oxide, or a co-precipitate of cobalt and manganese hydroxide, may be mixed with titania, followed by extrusion. Or, titania may be extruded, and in a later step the extrudates may be impregnated with a cobalt compound, preferably with a cobalt salt that is soluble in water and/or ethanol.

For optimal shaping, it may be advantageous to add a binder material, for example to increase the mechanical strength of the catalyst or catalyst precursor. Additionally or alternatively, a liquid may be added to the carrier material before or during its shaping. The liquid may be any of suitable liquids known in the art, for example: water; ammonia, alcohols, such as methanol, ethanol and propanol; ketones, such as acetone; aldehydes, such as propanol and aromatic solvents, such as toluene, and mixtures of the aforesaid liquids. A most convenient and preferred liquid is water. The liquid may include viscosity improvers such as a polyvinylalcohol.

In case of extrusion, one may want to improve the flow properties of the carrier material. In that case it is preferred to include one or more flow improving agents and/or extrusion aids prior to extrusion. Suitable additives include fatty amines, quaternary ammonium compounds, polyvinyl pyridine, sulphoxonium, sulphonium, phosphonium and iodonium compounds, alkylated aromatic compounds, acyclic mono-carboxylic acids, fatty acids, sulphonated aromatic compounds, alcohol sulphates, ether alcohol sulphates, sulphated fats and oils, phosphonic acid salts, polyoxyethylene alkylphenols, polyoxyethylene alcohols, polyoxyethylene alkylamines, polyoxyethylene alkylamides, polyacrylamides, polyols and acetylenic glycols. Preferred additives are sold under the trademarks Nalco and Superfloc.

To obtain strong extrudates, it is preferred to include, prior to extrusion, at least one compound which acts as a peptising agent for the titania. Suitable peptising agents are well known in the art and include basic and acidic compounds. Examples of basic compounds are ammonia, ammonia-releasing compounds, ammonium compounds or organic amines. In case of a calcination step after shaping, such basic compounds are removed upon calcination and are not retained in the extrudates. This is advisable as such basic compounds may impair the catalytic performance of the final product. Preferred basic compounds are organic amines or ammonium compounds. A most suitable organic amine is ethanol amine. Suitable acidic peptising agents include weak acids, for example formic acid, acetic acid, citric acid, oxalic acid, and propionic acid.

Optionally, burn-out materials may be included prior to extrusion, in order to create macropores in the resulting extrudates. Suitable burn-out materials are commonly known in the art.

The total amount of flow-improving agents/extrusion aids, peptising agents, and burn-out materials in the carrier material to be extruded preferably is in the range of from 0.1 to 20% by weight, more preferably from 0.5 to 10% by weight, on the basis of the total weight of the mixture.

After shaping, the carrier material, optionally including further components, may be strengthened by calcination thereof in a manner known in the art. Titania is preferably calcined at a temperature between 350 and 700° C., more preferably between 400 and 650° C., more preferably between 450 and 600° C. A calcination step is nevertheless optional when preparing a Fischer-Tropsch catalyst comprising titania and cobalt.

Activation of a fresh prepared catalyst can be carried out in any known manner and under conventional conditions. For example, the catalyst may be activated by contacting it with hydrogen or a hydrogen-containing gas, typically at temperatures of about 2000 to 350° C.

The catalyst that is subjected to the process of the current invention has been deactivated by use in a Fischer-Tropsch process.

The Fischer-Tropsch process is well known to those skilled in the art and involves synthesis of hydrocarbons from syngas, by contacting the syngas at reaction conditions with the Fischer-Tropsch catalyst.

The synthesis gas can be provided by any suitable means, process or arrangement. This includes partial oxidation and/or reforming of a hydrocarbonaceous feedstock as is known in the art. To adjust the $H_2/CO$ ratio in the syngas, carbon dioxide and/or steam may be introduced into the partial oxidation process. The $H_2/CO$ ratio of the syngas is suitably between 1.5 and 2.3, preferably between 1.6 and 2.0.

The syngas comprising predominantly hydrogen, carbon monoxide and optionally nitrogen, carbon dioxide and/or steam is contacted with a suitable catalyst in the catalytic conversion stage, in which the hydrocarbons are formed. Suitably at least 70 v/v % of the syngas is contacted with the catalyst, preferably at least 80%, more preferably at least 90%, still more preferably all the syngas.

A steady state catalytic hydrocarbon synthesis process may be performed under conventional synthesis conditions known in the art. Typically, the catalytic conversion may be effected at a temperature in the range of from 100 to 600° C., preferably from 150 to 350° C., more preferably from 175 to 275° C., most preferably 200 to 260° C. Typical total pressures for the catalytic conversion process are in the range of from 5 to 150 bar absolute, more preferably from 5 to 80 bar absolute. In the catalytic conversion process mainly C5+ hydrocarbons are formed.

A suitable regime for carrying out the Fischer-Tropsch process with a catalyst comprising particles with a size of at least 1 mm is a fixed bed regime, especially a trickle flow regime. A very suitable reactor is a multitubular fixed bed reactor.

Experimental
Measurement Methods
Strength

Mechanical strength of particles can be measured in many ways, but include flat plate crushing strength (FPCS) and bulk crush strength (BCS).

Flat plate crushing strength (FPCS) is generally regarded as a test method to measure strength at which catalyst particles collapse. A strength of about 70 N/cm is generally regarded as the minimum strength required for a catalyst material to be used in chemical reactions such as hydrocarbon synthesis, preferably at least 74 N/cm, more preferably at least 100 N/cm, most preferably at least 120 N/cm. The strength can be related to the compressive strength of concrete being tested in a similar test method (i.e. 10 cm cubed sample between plates), but on a larger scale.

Currently, there is no national or international test or ASTM for flat plate crushing strength. However, the "compression test" for concrete, used to measure compressive strength, is well known in the art. Furthermore the general shapes formed by catalysts or catalyst preformers, for example the shape of extrudates such as cylinders or 'trilobes' are well known. The flat plate crushing test strength is independent of product quality in terms of performance in a catalytic reaction.

Naturally, any comparison of flat plate crushing strength must be made between equivalently shaped particles. Usually, it is made between the "top" and "bottom" sides of particles. Where the particles are regularly shaped such as squares, it is relatively easy to conduct the strength tests and make direct comparison. It is known in the art how to make comparisons where the shapes are not so regular. It is generally intended by the present invention to provide a catalyst preformer which has the same or higher flat plate crushing strength as the same type of catalyst preformer which was previously calcined.

Diameter

The average diameter of the particles of a catalyst may be determined with a commercially available instrument for the determination of particle size distribution and particle shape, such as Camsizer® ex Hi-Tech Instruments (HTI).

Additionally or alternatively, the average diameter may be determined by photographing a number of particles on a sheet, or by making a picture of a number of particles using a flat bed scanner. The picture is preferably made of at least 10 particles, preferably about 100 to 200 particles. The particles that are used to determine the average diameter all have a size of at least 1 mm (i.e. a longest internal length of at least 1 mm); smaller particles are not counted. The particles on the image preferably do not touch each other. The broadest diameter of each of the particles is measured, optionally in an automated process, and the arithmetic average is calculated.

Activity

Catalytic activities can be measured, for example, in a model Fischer-Tropsch reactor. The catalytic activities measured may be expressed as space time yield (STY) or as an activity factor, whereby an activity factor of 1 corresponds to a space time yield (STY) of 100 g/l.hr at 200° C.

EXAMPLE

A mixture was prepared containing commercially available titania powder (P25 ex. Evonik), a co-precipitate of cobalt and manganese hydroxide, water and several extrusion aids. The mixture was kneaded for and shaped using extrusion. The extrudates were dried and calcined. The obtained catalyst (precursor) contained about 20 wt % cobalt and about 1 wt % of manganese.

This catalyst was used in a Fischer-Tropsch process for several years. Thereafter, Fischer-Tropsch product was removed from the spent catalyst using gas oil that was prepared with Fischer-Tropsch. The spent catalyst was oxidised in situ in the reactor at a temperature of 270° C. for one day. In a subsequent step spent catalyst particles were removed from the reactor.

The activity, strength, and diameter of the spent catalyst were determined (Comparative Example). Samples of the deactivated catalyst were further oxidised (ex situ) for a period of two hours at several temperatures. The activity, strength, and diameter of the further oxidised catalyst samples were determined. The activity measurements were performed at a temperature of 225° C. and a total pressure of 60 bar abs.

Table 1 shows the measurement results of Samples 1 to 6 relative to the Comparative Example described above. The temperature used during step (ii) for samples 1 and 6 was outside the ranges claimed. Samples 1 and 6 thus also are comparative examples.

TABLE 1

| Spent catalyst | In situ Oxidation temperature | Ex situ Oxidation temperature | Relative Activity | Relative Strength | Change in Diameter |
|---|---|---|---|---|---|
| Compar. Example | 270° C. | — | 100% | 100% | 0.0% |
| Sample 1; compar. | 270° C. | 500° C. | 141% | 136% | −0.4% |
| Sample 2 | 270° C. | 550° C. | | 136% | −0.3% |
| Sample 3 | 270° C. | 600° C. | 133% | 147% | −0.6% |
| Sample 4 | 270° C. | 625° C. | | 200% | −2.4% |
| Sample 5 | 270° C. | 650° C. | 36% | 264% | −4.2% |
| Sample 6; compar. | 270° C. | 700° C. | | 419% | −8.0% |

The experimental data for samples 2 to 5 thus show that the strength of the deactivated cobalt and titania comprising Fischer-Tropsch catalyst particles can be increased significantly, and swollen catalyst particles can be made to shrink significantly, while the catalyst particles show sufficient catalytic activity after the regeneration.

When performed in situ, the effect of the process on the catalyst particles will be similar, while the catalyst bed does not need to be taken out of the reactor tube, and also does not need to be put back in the reactor tube. After the regeneration, the catalyst particles in the fixed bed can immediately be used in a Fischer-Tropsch process again by contacting the fixed bed with a mixture of carbon monoxide and hydrogen at an elevated temperature and pressure.

We claim:

1. A process for regenerating a fixed bed of Fischer-Tropsch catalyst particles, of which at least 40 wt % of the catalyst particles have a size of at least 1 mm, and the fixed bed comprises cobalt and titania comprising Fischer-Tropsch catalyst particles which have been deactivated by use in a Fischer-Tropsch process, said process for regenerating being performed in situ in a Fischer-Tropsch reactor tube, and comprising the steps of:
   (i) oxidising the catalyst particles at a temperature between 200 and 400° C. by passing an oxygen containing gas through the reactor tube, less than 0.1 vol % of said oxygen containing gas consisting of water,
   (ii) letting an inert gas having a temperature in the range of from 75 to 150° C. flow through the reactor tube, while cooling the reactor tube from the outside,
   (iii) oxidising the catalyst particles at a temperature above 600° C., and below 670° C. by
   letting an oxygen containing gas flow through the reactor tube while cooling the reactor tube from the outside, less than 0.1 vol % of said oxygen containing gas consisting of water, and
   (iv) reducing the catalyst particles with hydrogen or a hydrogen comprising gas.

2. A process as claimed in claim 1, wherein at least 40 wt % of the catalyst particles have a size of at least 3 mm.

3. A process as claimed in claim 1, wherein at least 60 wt % of the catalyst particles have a size of at least 1 mm.

4. A process according to claim 1, wherein the cooling is performed by means of water and/or steam.

5. A process according to claim 1, wherein Fischer-Tropsch synthesis product is removed from the Fischer-Tropsch catalyst prior to the oxidising step of step (i).

6. A process according to claim 5, wherein the removal is performed by washing the catalyst with petroleum gas oil or a synthetic gas oil.

7. A process according to claim 1 wherein the oxidising step (ii) is performed at a temperature between 600° C. and 650° C.

* * * * *